Feb. 18, 1941. H. H. CARY 2,232,211
AUTOMATIC VOLTAGE AND pH INDICATOR
Filed Dec. 6, 1938 4 Sheets-Sheet 1
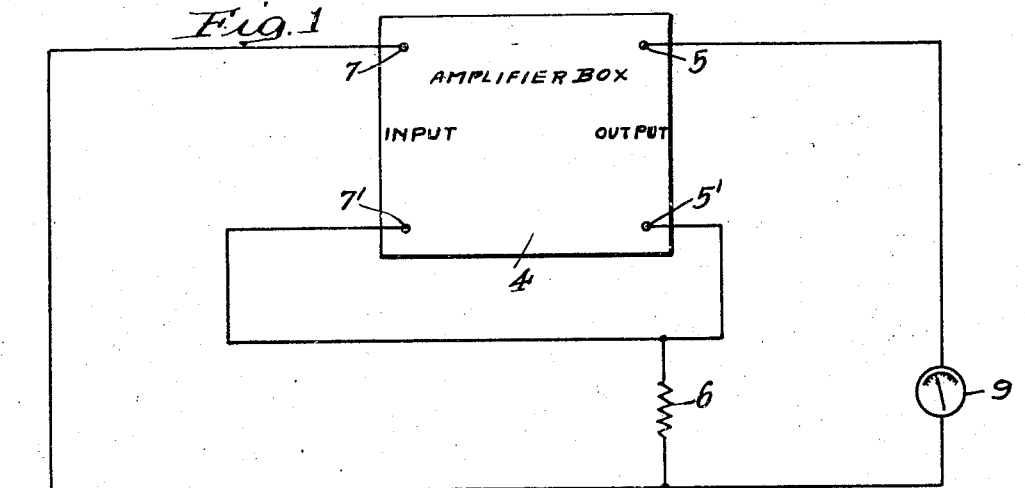
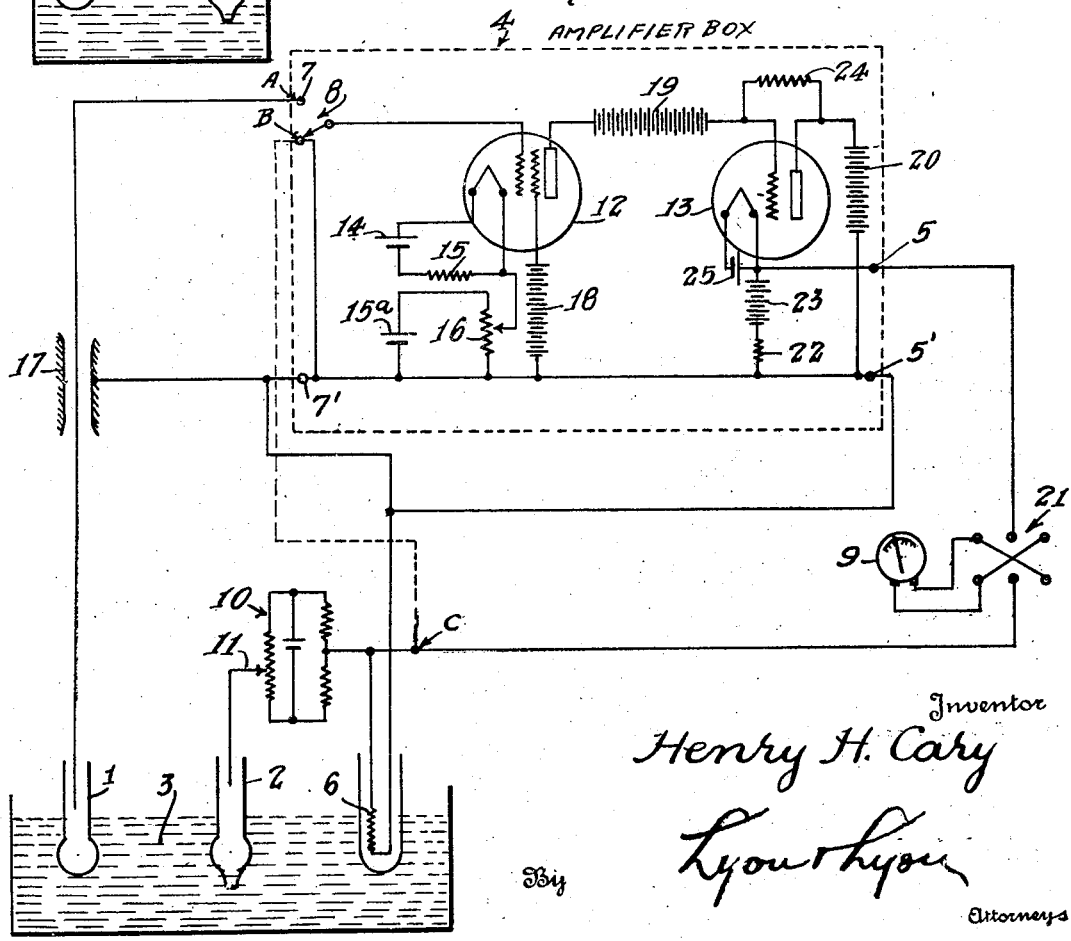
Inventor
Henry H. Cary
By Lyon+Lyon
Attorneys Feb. 18, 1941.  H. H. CARY  2,232,211
AUTOMATIC VOLTAGE AND pH INDICATOR
Filed Dec. 6, 1938   4 Sheets-Sheet 2

Inventor
Henry H. Cary
By Lyon+Lyon
Attorneys

Feb. 18, 1941.     H. H. CARY     2,232,211
AUTOMATIC VOLTAGE AND pH INDICATOR
Filed Dec. 6, 1938     4 Sheets-Sheet 3

Inventor
Henry H. Cary
By Lyon & Lyon
Attorneys

Feb. 18, 1941.  H. H. CARY  2,232,211
AUTOMATIC VOLTAGE AND pH INDICATOR
Filed Dec. 6, 1938  4 Sheets-Sheet 4
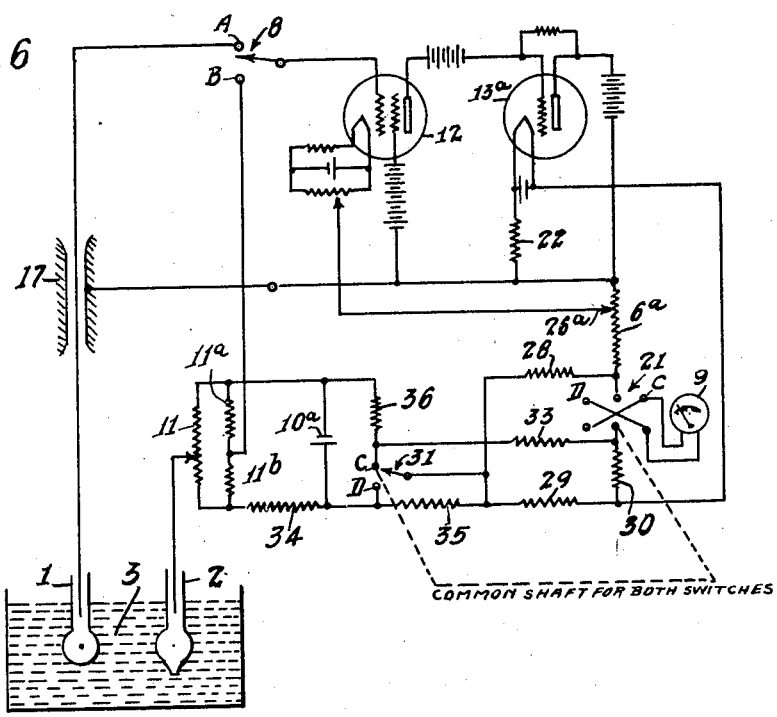
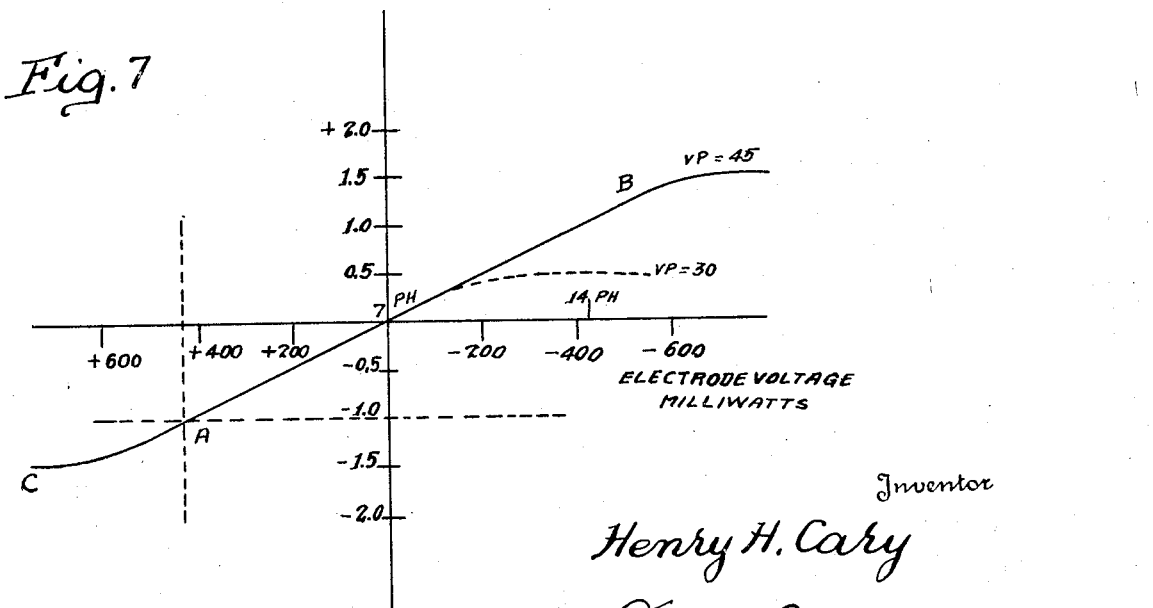
Inventor
Henry H. Cary
By Lyon & Lyon
Attorneys Patented Feb. 18, 1941

2,232,211

UNITED STATES PATENT OFFICE 2,232,211

AUTOMATIC VOLTAGE AND pH INDICATOR

Henry Howard Cary, Santa Monica, Calif., assignor to National Technical Laboratories, Pasadena, Calif., a corporation of California Application December 6, 1938, Serial No. 244,210

17 Claims. (Cl. 175—183)

This invention relates to an apparatus for determining voltage, and refers particularly to an apparatus to determine the voltage of a glass electrode pH measuring cell, thereby indicating directly the pH of a solution tested by the cell.

The present invention has for its principal object to provide a type of voltmeter which, although useful for other purposes, is particularly adapted to indicate the pH when connected to a glass electrode pH measuring cell.

It is well known that the pH of the electrolyte of such a cell may be expressed in terms of the cell voltage E in the form:

$$(pH - P_0) = -\left(\frac{E - E_0}{.00019832T}\right) \quad \text{(Eq. 1)}$$

where T is the absolute temperature, and $P_0$ and $E_0$ are constants independent of the temperature to a first approximation and dependent upon the composition and structure of the particular cell employed.

It is a particular object of the present invention to provide an instrument which may be adjusted to produce an indication on the dial of a milliammeter calibrated in pH units, in accordance with the cell voltage and the above algebraic relation, without drawing detrimental current from the cell, and without manual operation other than occasional readjustment of the instrument.

A further object of the present invention is to provide an apparatus which may be easily adjusted to operation and which is so constructed that the adjustment once made may be maintained for satisfactory periods of time.

Various further objects and advantages of the present invention will be understood from a description of the following examples of the apparatus embodying the invention, for which purpose reference is made to the accompanying drawings, in which Figure 1 is a diagrammatic view of an apparatus constructed in accordance with the principles of the present invention.

Figure 2 is an electrical diagram showing the circuit diagram of the amplifier box forming a part of the apparatus of Figure 1.

Figure 6 is an electrical diagram of a further modified form of the invention.

Figure 7 is a chart illustrating in part the action of the apparatus shown in Figure 5.

Figure 3:
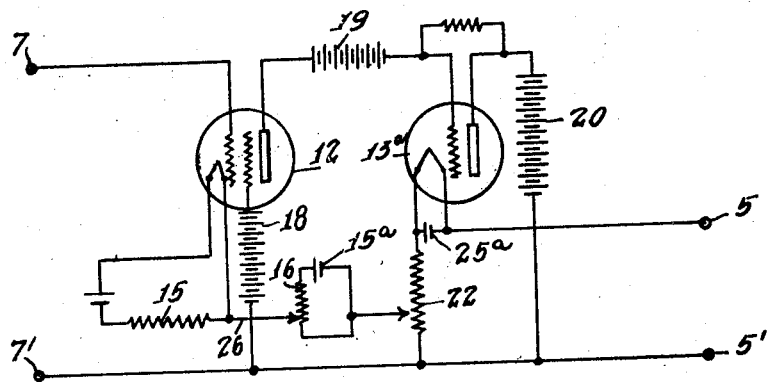
Figure 3 is an electrical diagram of a modified form of the invention.

The apparatus of the present invention is intended to measure the voltage of a cell, such as the glass electrode type of pH cell. In Figure 1 of the drawings the glass electrode 1 and the calomel electrode 2 are shown immersed in a solution 3 to be tested. When making pH determinations with glass electrodes the voltage between electrodes 1 and 2 should be measured without drawing an appreciable current. For example, $10^{-11}$ amperes may be set as the upper limit of current which it is permissible to draw from the cell in making such measurements. Attempts have been made to measure the voltage of such a cell by the use of a simple D. C. vacuum tube amplifier, the input leads of which connect directly to the pH cell or source under measurement, and the output leads to a calibrated milliammeter. By proper adjustment of the vacuum tube, such as by operating the same at low voltages and cathode temperature, together with other precautions, the grid circuit of the vacuum tube may be made to draw the desired low value of current from the cell under measurement. However, the current flowing in the output circuit of such an amplifier is not a linear reproduction of the voltage applied to the grid, and moreover varies with battery voltages and condition of the tube, so that a vacuum tube so operated is not satisfactory for the measurement of voltages or pH, particularly because it is difficult to establish and maintain a calibration for any length of time. These difficulties are overcome in the apparatus of the present invention, the fundamental characteristics of which are illustrated in Figure 1.

In Figure 1 the electrodes 1 and 2 (or other source of voltage to be measured) are connected to the input terminals 7 and 7' of an amplifying device generally indicated by the amplifier box 4. The electrode 2 is indicated as connected to the terminal 7' through a resistor 6. The resistor 6 is also included with meter 9 in the output circuit of the amplifier, which includes the output terminals 5 and 5'. The amplifier indicated generally by the amplifier box 4 in order to carry out the purposes of the present invention should be capable of satisfying the following conditions:

(1) It should be of the D. C. type—that is, it must be capable of responding continuously to steady input potentials.

(2) It must be of such a type that the input terminal 7' may be connected to the output terminal 5' without interfering with its operation.

(3) It must be of such a type that a decrease in the potential of input terminal 7 relative to input terminal 7' will produce an increase in the current flowing from output terminal 5 through meter 9 and resistor 6 to output terminal 5'.

In this type of amplifier, the current in the output circuit may be represented approximately by the equation:

$$I = -(e-e_0)G \quad \text{(Eq. 2)}$$

where $e$ is the input voltage to the amplifier; $G$ a constant expressing the output current per unit of input potential (hereafter referred to as the mutual conductance of the amplifier); and $e_0$ is a constant which theoretically equals the input voltage at which the output current is zero.

In the circuit of Figure 1 the input voltage to the amplifier may be expressed by the relation:

$$e = E + IR \quad \text{(Eq. 3)}$$

where $E$ is the voltage to be measured (that is, of the cells 1 and 2), and $IR$ is the potential drop across the resistor 6.

Combining these equations, there results the following relationship:

$$I = -\frac{(E-e_0)}{R + \frac{1}{G}} \quad \text{(Eq. 4)}$$

From the above relation, it may be seen that if the amplifier 4 is so designed that $1/G$ is negligibly small compared with the value $R$ of resistor 6, the expression reduces to:

$$I = -\frac{(E-e_0)}{R} \quad \text{(Eq. 5)}$$

so that the current flowing in the meter 9 is linearly related to the input voltage of the cell 1—2.

While in a practical amplifier the assumed constant $G$, in fact, varies considerably with input voltage, battery voltage, and tube conditions, the variation in $G$ will not disturb the linear relation between the meter current and measured voltage so long as $1/G$ remains sufficiently small as compared with the value of resistor 6 that variations in $1/G$ may be neglected.

Thus, in accordance with the present invention, a voltmeter is obtained which indicates directly the D. C. voltage of a source without drawing appreciable current and without introducing errors due to non-linearity or other variations in the amplifier. Comparing Equations 1 and 5, if $e_0 = E_0$ and $R = KT(.00019832)$ where $K$ is a constant, then $$(pH - P_0) = IK \quad \text{(Eq. 7)}$$

Therefore, a circuit and amplifier constructed to satisfy these conditions will produce a current through a meter depending solely on the pH of the solution in spite of variations in the amplifier characteristics or in the temperature of the solution.

According to Equation 7, the current through the meter is zero when the pH of the solution is equal to the electrode constant $P_0$. This imposes a limitation on the electrode system that can be used with a given meter calibration. Although this limitation usually causes no difficulty in design, it may be eliminated in various ways. For instance, if it is desired that the current through the meter be some value other than zero when the pH of the solution is equal to the electrode constant $P_0$, a constant current of this value may be caused to flow through meter 9 of Fig. 1, in addition to that which flows from the amplifier, by connecting an auxiliary source of potential in shunt with meter 9 through a suitable resistor.

Now, referring to Figure 2 of the drawings, there is illustrated one form of the present invention in which the amplifier 4 comprises a two-tube battery operated D. C. vacuum tube amplifier, the apparatus being designed so that the meter 9 may read directly in pH units over the range of 0 to 14 with an accuracy of better than 0.1 pH. In this apparatus the glass electrode 1 may, for example, be of a type described in the application of Henry H. Cary and Warren P. Baxter, entitled "Electrode for the electrical determination of pH," Serial No. 164,696, filed on September 20, 1937, and contains a silver-silver chloride internal reference electrode and a solution of 0.1 N in chloride ion and a buffer of pH 5.8. The calomel electrode is of the conventional design. These electrodes form a pH measuring cell whose constants (see Equation 1) are approximately:

$$E_0 = 0.00 \pm .01 \text{ volt}$$
$$P_0 = 7.00$$

Since the constant $E_0$ varies slightly from one electrode system to another, it is necessary to provide an adjustable voltage source 10 (adjustable by sliding contact 11), hereafter referred to as "asymmetry potential corrector," to add or subtract a suitable voltage from the electrode system to compensate for these variations. When properly adjusted, this makes the effective value of $E_0$ equal to zero.

From the Equation 7 it is seen that for this electrode system $$Ik = (pH - 7.00) \quad \text{(Eq. 8)}$$

Accordingly, only in the range above 7.00 pH will the current through meter 9 be positive, i. e., flow in the direction assumed in deriving Equation 5. Below 7.00 pH the current will flow in the opposite direction. Although the meter 9 could be specially constructed to give proper indications under these conditions, it is desirable to use a meter of standard construction in conjunction with the reversing switch 21. By this means, the scale of meter 9 is separated into two ranges, 7.00 to 0.00 and 7.00 to 14.00, each covering the full length of the meter scale. This doubles the effective length of the scale with consequent improvement in accuracy and ease of reading.

The meter 9 may be chosen to have a sensitivity such that 0.1 milliampere causes a full scale deflection corresponding to 7.00 pH units. In this case, the constant $K$ in Equation 7 is seen to have a value of 70,000, and the expression for the value of $R$ becomes:

$$R = 70,000(.00019832)T = 13.682T \quad \text{(Eq. 9)}$$

Since $T$ is the absolute temperature of the solution 3, $R$ must vary if the temperature of the solution under measurement varies. This variation in $R$ may be automatically accomplished by constructing resistor 6 of resistance wire having a temperature coefficient in accordance with Equation 9 and mounting it in a protecting jacket immersed in the solution 3, so that it assumes the temperature of the solution.

Various tubes may be employed in amplifier 4. For example, I have used a type 32E for tube 12 and a type 30 for tube 13. In order to reduce its grid current, the tube 12 is preferably operated at low filament, plate, and screen voltages. I find satisfactory operation of a type 32E tube may be obtained with a filament voltage of 1.0 volt supplied by battery 14 through voltage reducing resistor 15; screen voltage of approximately 20 volts supplied by battery 18 and plate voltage of approximately 20 volts supplied by battery 18 and plate voltage of approximately 20 volts supplied by battery 19 in conjunction with battery 20 and plate resistor 24. Under these conditions, plate resistor 24 should have a value between 50 and 100 megohms for maximum gain and circuit stability. Grid biasing voltage for tube 12 is supplied by battery 15ª and is adjusted by potentiometer 16 in conjunction with switch 8 in a manner to be described below.

Filament current for tube 13 is supplied at 1.5 volts by battery 25 and plate current is supplied at approximately 25 volts by battery 20.

The amplifier output terminals 5 and 5′ are connected in the cathode circuit of tube 13 in order to satisfy the third condition mentioned previously, i. e., that the current flowing in the output terminals through the meter 9 and resistor 6 will increase with the decrease in potential of input terminal 7 relative to input terminal 7′.

Since the Equation 8 demands that the amplifier deliver currents to the external circuit in either direction and tube 13 will operate with the current flowing in one direction only, it is necessary to include resistor 22 and battery 23 in the cathode circuit of tube 13 to maintain the flow of current through the tube in the proper direction. In effect, this resistor and battery cause current to be by-passed directly from terminal 5 to terminal 5′, so that the cathode current of tube 13 is always larger than the current through meter 9. The resistor and battery are so proportioned that the by-passed current exceeds the most negative value of current that can flow through meter 9. There will then be no necessity for the cathode current to flow in the negative direction since it is equal to the algebraic sum of the meter and by-passed currents, and this sum will always be positive. Suitable values for resistor 22 and battery 23 would be 20,000 ohms and 6 volts respectively.

The constant G for this amplifier has a value of about 0.05 ohm, making 1/G about 20 ohms. Since R has a value of about 4100 ohms, depending on the temperature, 1/G may be neglected in comparison to R for the order of accuracy desired in this instrument.

The resistance of glass electrode I may be very high—500 megohms, for example—so that minute currents leaking across the insulation of the glass electrode lead and flowing through the glass electrode will produce a voltage drop in the electrode that will cause erroneous results. Since these leakage currents can flow only in response to a voltage difference across the insulation, they may be minimized by keeping this voltage difference small. This is the function of the "guard shield" 17 on which all the insulation of the lead from the glass electrode to the first amplifier tube is mounted. Guard shield 17 is electrically connected to terminal 7′ of amplifier 4, and since the potential difference between terminals 7 and 7′ is very small, the leakage currents are minimized.

To operate the instrument of Figure 2, a preliminary adjustment of the amplifier must be made to make the amplifier constant $e_0$ equal to zero. This is accomplished by placing switch 8 in position B, and adjusting bias potentiometer 16 until no current flows in meter 9. Electrodes I and 2 and resistor 6 are then immersed in a solution of known pH, switch 8 placed in position A, and asymmetry potential corrector 10 is adjusted until meter 9 indicates the known pH. Meter 9 will then correctly indicate the pH of unknown solutions in which the electrodes and resistor 6 are immersed.

Because the gain of amplifier 4 is quite high, the adjustment of the bias control as described above will appear to be very critical. Actually, there is no necessity for such critical adjustment, and it is desirable to reduce the gain of the amplifier for this adjustment. This can be conveniently accomplished by connecting contact B of switch 8 to point C, as shown by the dotted line, instead of to terminal 7′, as shown in the full line. Terminal 7′ and point C are at the same potential when no current flows in meter 9 and consequently the adjustment of bias potentiometer 16 is correctly made as before, but at the same time the sensitivity is reduced to a reasonable value.

While the apparatus of Figure 2 is satisfactory in operation, it is open to criticism because of the use of the 0.1 milliampere meter. Such meters are expensive and delicate and frequently do not maintain an accurate calibration for an extended period. From the commercial point of view, it would be desirable to re-design the apparatus to employ the more rugged and less expensive 1.0 milliampere meter.

Consideration of the circuit shows that R would have a value of about 414 ohms if a 1.0 milliampere meter was used. Since the value of 1/G for the amplifier in Figure 2 is about 20 ohms, the condition that variations in 1/G are negligibly small in comparison with R is no longer fulfilled. Furthermore, this amplifier is not capable of delivering output current throughout the required range of −1.00 ma. to +1.00 ma. Consequently, in order to use the 1.0 milliampere meter, it would be necessary to re-design the amplifier to have a higher gain and a greater current output ability.

A satisfactory amplifier for use with a 1.0 milliampere meter could be constructed using three tubes. However, such an amplifier requires several additional batteries and is, therefore, bulky and has a relatively high battery maintenance cost. As an alternative, the gain of the two-tube amplifier may be increased through the use of regeneration. By this means the gain may be made very large and theoretically may be made indefinite without increasing the number of tubes or batteries.

One method of applying regeneration is shown in the circuit in Figure 3 of the drawings. In this, as in subsequent drawings, no attempt is made to indicate means for compensating the effect of temperature changes on the electrode, as was done in Figure 2. The instrument may be calibrated to be operated at a specific temperature. It will be readily understood, however, that in all cases such compensation may be provided by varying certain of the resistors of the circuit either directly through the temperature coefficient of the resistor, as was indicated in connection with the apparatus of Figure 2, or by any other preferred or desired means.

In Figure 3 of the drawings, a 49 tube as connected as a class "A" triode is shown as preferably substituted for the 30 tube of Figure 2, in order to obtain the larger output current required to operate a 1.0 milliampere meter. For the same reason, it is necessary to increase plate supply battery 20 to approximately 45 volts. The change to a 1.0 milliampere meter permits the potential of battery 23 in Figure 2 to be reduced to the value of the battery 25ª employed for the filament supply of the 49 tube so that the battery 23 may be eliminated entirely.

In the circuit of Figure 3 regeneration is accomplished by connecting the cathode return lead 26 to a tap on the by-pass resistor 22. The effect of making this connection may be visualized by assuming that a slight positive potential is applied to the grid of tube 12. This will be amplified and will appear as a negative change in potential on the grid of the tube 13ª, which will in turn cause the cathode of the tube 13ª to change potential in the negative direction. By-pass resistor 22 will act as a voltage divider for this change in cathode potential and consequently will apply a small negative change in the potential to the cathode of the 32 tube. This has the same effect as the original positive change in the potential of the grid of the tube 12. Consequently, the original positive change in potential is reinforced. If the effect of the cathode change in potential is equal to the effect of the original change in grid potential, the gain of the amplifier will theoretically be made infinite. The point on the by-pass resistor to which the cathode return lead 26 is connected is made adjustable so as to permit this condition to be approximately attained. However, it is not easy to make this adjustment because each change in the adjustment of regeneration control 22 alters the bias on tube 12 so that bias potentiometer 16 must be readjusted. To overcome this disadvantage, the circuit of Figure 4 may be employed.

Figure 4:
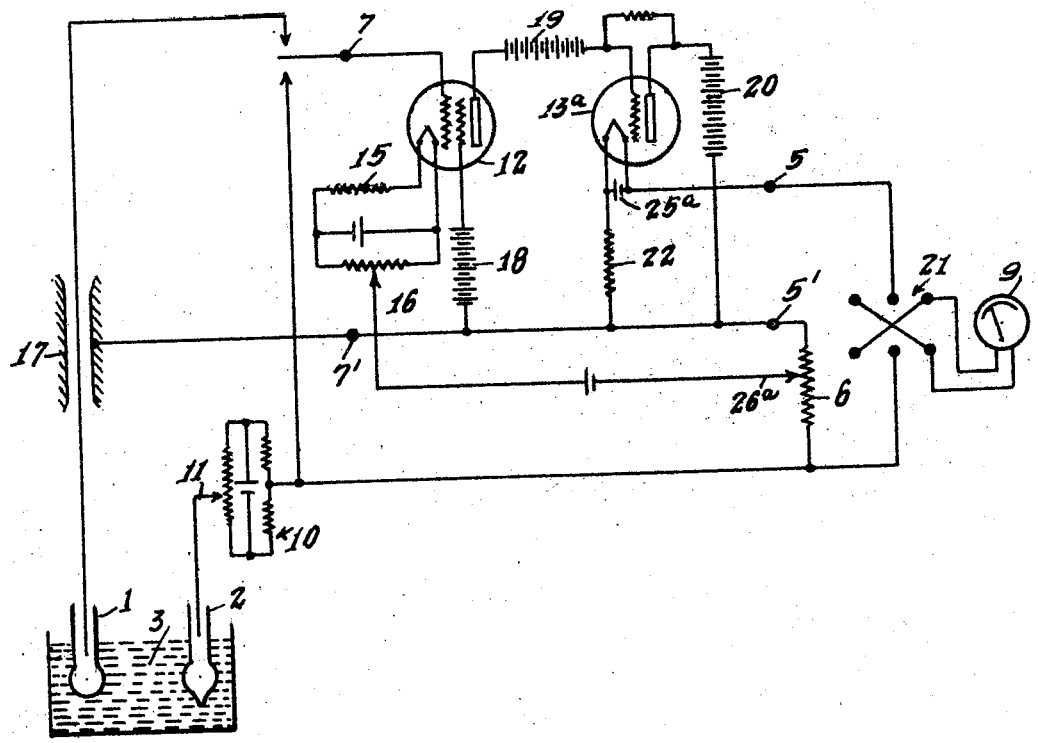
Figure 4 is an electrical diagram of a further modified form of the invention.

In the circuit of Figure 4 of the drawings regeneration is effected by connecting the cathode return lead 26ª of the tube 12 to the load resistor 6. Connecting the cathode return to the load resistor 6 does not affect the operation of resistor 6, since the cathode current of the tube 12 is about one microampere, a quantity too small to produce an appreciable voltage drop in the load resistor 6 or to be noticed in the meter reading. As far as regeneration is concerned, this connection operates in exactly the same manner as the tap taken on the by-pass resistor 22 in Figure 3. The connection to the load resistor 6 of the regeneration control, however, permits independent adjustment of the bias and regeneration control.

The setting of the regeneration control for the maximum gain is rather critical and varies somewhat with different tubes and battery voltages. It is, therefore, desirable to provide means by which this adjustment may be conveniently made. I have adopted a method which depends on the fact that when properly adjusted the output current of the instrument bears a definite ratio to the potential applied to the input. The circuit arrangements of this invention, hereafter referred to as "checking circuits," render it possible to compare the applied input voltage with the amplifier output current in a single operation using the milliammeter as a null instrument. Several such arrangements are possible, but, in general, they have the following features in common:

(1) A current from a battery is passed through a resistor, producing a potential difference which is applied to the input of the instrument.

(2) The indicating meter current which normally would flow from the amplifier output as a result of the input potential difference is opposed by a flow of current derived from the battery producing the input potential difference.

(3) The input potential difference and the opposing current are so proportioned that complete cancellation of the indicating meter current occurs when the regeneration control is set at the proper point.

(4) The process under paragraph (2) is carried out in such a way that the operating conditions of the amplifier are not altered. The essential point of this condition is that the input potential difference must produce the same amplifier output current whether the opposing current flows or not.

Figure 5:
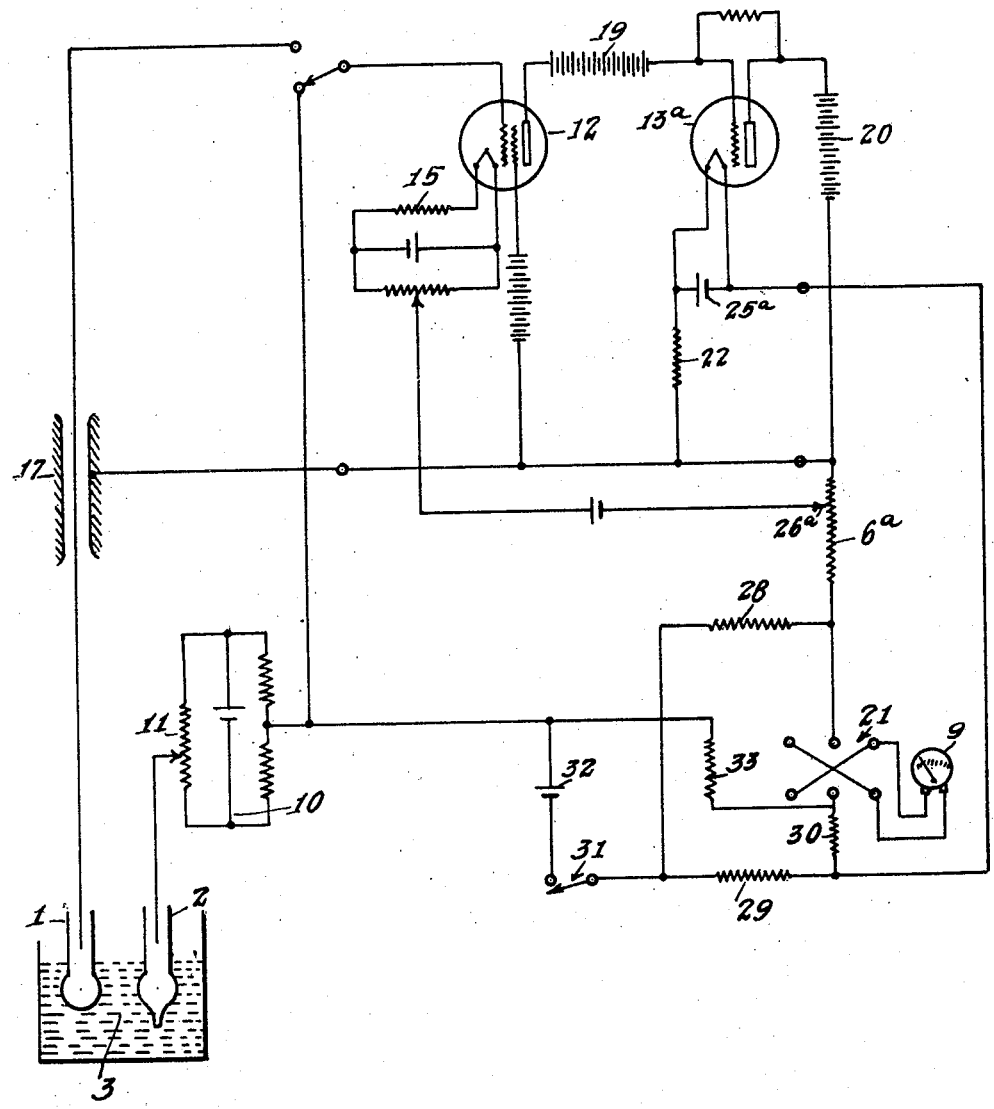
Figure 5 is an electrical diagram of a further modified form of the invention.

The circuit of Figure 5 of the drawings is derived from the circuit of Figure 4 and was made to incorporate a means for checking regeneration adjustment by the above method. In this diagram the resistor 6 is replaced by the resistor 6ª, the shunt resistance "Ro" of the meter 9, and resistor 28. The resistance Ro of the meter is arranged in a bridge circuit, including the resistors 28, 29, and 30 so proportioned that the resistance 28 divided by the resistance Ro of the meter will equal the resistance 29 divided by the resistance 30. Across the bridge there is provided a check switch 31, potential source 32, and resistor 33. The input lead to the potential adjuster 10, 11 and electrolytic cell 1, 2 is connected as indicated to the resistor 33. By this arrangement, the output current from the amplifier produces no voltage drop across the resistor 33. The voltage drop placed in combination with the voltage of the cell 1 and 2 is only the IR drop developed across the resistor 6ª and that across the resistance Ro of the meter. When the check switch 31 is closed, current flows through the resistor 33 through the meter 9 and resistor 28. Likewise, current flows through the resistors 30 and 29. Because of the bridge arrangement, the total potential drop around the amplifier output circuit is the same whether current flows from the checking battery 32 or not, and consequently no change occurs in the amplifier operating conditions from this cause. The flow of current from the check battery, however, produces a potential drop in the resistor 33, and this potential drop is placed in opposition to the potential drop across resistor 6ª and the resistance Ro of the meter and applied to the input circuit of the amplifier. This causes a current to flow in the amplifier output circuit. The value of the resistor 33 in the checking circuit is so proportioned that the amplifier output current flowing through the meter 9 will exactly cancel that flowing from the checking battery 32 to the meter 9 when the regeneration control 26ª is properly adjusted. Therefore, when the amplifier is properly adjusted, the indicating meter reads zero current whether the check switch is opened or closed.

Now, referring to Figure 6 of the drawings, the form of apparatus there illustrated is intended to combine the checking battery with the asymmetry potential corrector battery. This apparatus is also intended to lower the plate supply voltage which must be applied to the amplifier, so that an apparatus is provided which will require the minimum batteries for its operation.

As previously indicated, the minimum plate supply voltage of the 49 tube is determined by the maximum plate current that the 49 tube is required to deliver to the by-pass resistor and output circuit. If the plate supply voltage falls below this minimum, the 49 tube will not be able to deliver the required current, and the gain of the amplifier will decrease and the instrument will no longer respond linearly to the cell voltage. This is illustrated in the diagram of Figure 7, which is a plot of the output meter current against the cell voltage for the circuit of Figure 5. The portion of the curve between A and B is very nearly a straight line and includes the normal operating range of the instrument. To the left of the point A the region of plate current cut-off of the 49 tube is reached and the curve approaches asymptotically to the line representing the by-pass resistor current. To the right of the point B the 49 tube starts drawing grid current through the plate resistor of the 32 tube, producing an IR drop in the resistor tending to decrease the grid voltage of the 49 tube. As a result of this effect, the grid of the 49 tube cannot be driven positive by the 32 tube and the plate current does not increase appreciably after grid current starts to flow.

When the plate supply voltage is reduced to, for example, 30 volts, readings greater than 8 pH cannot be obtained accurately, although the accuracy remains unimpaired below this value. By making use of the checking circuit, it is possible to operate the instrument so that only the lower half of the curve is used in both ranges of the instrument. The effect of the checking circuit is that of shifting the origin along the line between A and B. Thus it is possible to shift the origin to the point A by designing the checking circuit to subtract 414 millivolts from the grid potential of the 32 tube and to add 1.0 milliammeter to the meter current. In this case, with the checking switch closed, the range from 7 to 14 pH can be covered with good linearity with a low plate voltage, whereas with the checking switch open the range from 0 to 7 pH is covered as before. By coupling the checking switch with the reversing switch used for changing the range, this shifting of the origin is accomplished without complicating the operating procedure and a considerable reduction in the size of the plate battery is made possible.

Referring to Figure 7, the apparatus incorporates the above principles and in addition shows a circuit by which the checking battery and the battery for the asymmetry potential corrector are combined. In the 7 to 14 pH range the switches are in position "C", and no current flows through the bridge circuit from the checking battery. The indicating meter 9 indicates directly the output current of the amplifier, which is the plate current of the 49 tube 13ª, less the current flowing through the bypass resistor 22. Thus, at a pH of 7.0 the plate current of the 49 tube, for example, is 0.75 milliampere, all of which passes through the bypass resistor 22, making the output current and the meter current zero. At a pH of 14 the current of the 49 tube is, for example, 2.0 milliamperes, of which 1.0 milliampere flows through the by-pass resistor 22, leaving an output current of 1.00 milliampere flowing in the meter circuit. It is apparent that these conditions would not permit satisfactory operation at a pH less than 7, since this would require the plate current of the 49 tube to decrease and the region of plate current cut-off would soon be reached.

However, throwing the reversing switch 21 into position "D" will permit the current to pass through the checking circuit from the battery 10ª, thereby subtracting 414 millivolts from the potentials applied to the grid of the 32 tube 12 and passing a current through the meter in such a way as to substract 1.0 milliampere from the amplifier output current flowing through the meter. Thus, at a pH of 7, in the 0–7 range, the amplifier is operating under the same conditions as it operates at a pH of 14 in the 7–14 range; 2 milliamperes flowing in the plate circuit of the 49 tube 13ª, 1.0 millampere through the by-pass resistor 22, and 1.0 millampere flowing to the meter circuit. In this case, however, there is an opposing current in the meter circuit from the checking battery which cancels the 1.0 milliampere current flowing from the amplifier output, making the net meter current zero. At a pH of zero the amplifier operates under the same conditions as at 7 pH in the 7–14 range, with no current flowing from the amplifier output but with the opposing current still flowing through the meter to produce a full scale deflection.

From this it can be seen that the maximum plate current required of the 49 tube 13ª has been reduced to 2.0 milliamperes, which can be obtained, for example, from a 30 volt plate supply with a good factor of safety. This operating system has another advantage in that it increases the accuracy obtainable with the instrument. In Figure 7 the section of the curve between A and B, although nearly straight, curves slightly upward. In consequence, the average slope of this curve in the range from 7 to 14 is slightly different than it is from 0 to 7, and a slight error is introduced if the calibration is assumed to have the same slope in both ranges. Under the improved system, the same section of the curve is used in both ranges, so that an average value of this slope may be used with a maximum deviation about one-fourth that encountered in using separate sections of the curve for the two ranges.

The circuit of Figure 6 is somewhat complicated as a result of using the asymmetry potential corrector battery 10ª as the checking battery. Resistors 11, 11ª and 11ᵇ form the same functions as the corresponding resistors in the other asymmetry potential correctors illustrated. Resistor 34 acts as a voltage dropping resistor, since it is usually not desirable to have a voltage drop across the potentiometer 11 greater than 120 millivolts. Resistor 35 acts as a load resistance to keep the current drain on the battery constant. Its resistance is equal to the net resistance of the bridge circuit as viewed from the battery 10ª. When the contacts are in the "D" position, the resistor 35 is shorted, and the current flows from the battery through the bridge circuit. In position "C" no current flows in the bridge circuit. Were it not for the resistor 35, this change in battery drain would change the battery voltage and cause a change in the asymmetry potential corrector voltage. However, when no current is flowing in the bridge circuit, an equal current flows through the resistor 12 and thus the drain on the battery is maintained constant. The resistor 36 is so proportioned that the current flowing through it in either position of the switch 31 produces a voltage drop which is exactly equal to the voltage drop produced in resistor 11ª. Thus, the junction between resistors 33 and 36 is always maintained at the same potential as the junction between resistors 11ª and 11ᵇ, so that the net result is the same as though these two points in the circuit were directly connected together but no current flowed between them, as actually is the case in the circuit of Figure 5. The direct connection is not used in the circuit of Figure 6, since any variation in the return current flowing to the battery from the bridge would change the voltage of the asymmetry potential corrector and produce an error. Such variation may arise in practice because of errors in adjusting the value of resistor 35, in which case the return current to the battery would be different in the two ranges. With the arrangement of Figure 6 the resistor 34 does not have to be adjusted in value with great accuracy.

The operating procedure of the apparatus of Figure 6 is the same as that outlined previously. The switches are positioned to cover first the 7 to 14 pH range and the switch 8 in position "B," the bias control potentiometer being positioned to bring the meter 9 exactly to the 7.00 pH position. The switch is then changed to the 0 to 7 pH range by moving the switches 31 and 21 to the "D" position, which puts the checking circuit in operation, and the regeneration control 26ᵃ is adjusted until the meter 9 again reads 7 pH. The asymmetry potential corrector 11 is adjusted by immersing the electrodes 1 and 2 in a buffer of known pH, moving switch 8 to the "A" position and switches 21 and 31 to the proper pH range, and adjusting the asymmetry potential control until the meter 9 indicates the known pH of the buffer solution. The instrument is then completely adjusted and requires only an occasional readjustment of the bias potentiometer to compensate for battery drift.

It will be readily understood that other devices may be used to replace or supplement the milliammeter shown in these circuits. Thus, current recorders or relays may be placed in series with the milliammeter to provide a permanent record or a control of the pH. Furthermore, a resistor may be connected in series with the milliammeter so that the meter current will produce a potential drop proportional to the pH. This potential drop may be applied to potentiometer-recorders to produce a permanent record, or may be subjected to further amplification to operate electromagnets, motors, signals, relays, or other apparatus. Hereafter, the term "indicating meter" shall include these modifications and the operation so performed will be referred to as "indicating."

Furthermore, it will be understood that those modifications developed for use with the glass electrode are not limited to such use but are useful for voltage indication purposes in general where the same objectives are desired as was outlined in connection with the glass electrode.

While the particular forms of the invention herein described are well adapted for carrying out the objectives of the present invention, various modifications and changes may be made, all coming within the principles of the invention as included in the appended claims.

I claim:

1. A voltage indicating apparatus, comprising an amplifying device including an input and an output portion, the input portion being arranged to include the voltage to be indicated, the output portion including an indicating meter and a resistance across which the output current will develop a voltage drop, the input portion being arranged to include said resistance with said voltage drop opposed to said voltage to be indicated, said amplifying device embodying regenerative means to increase its mutual conductance.

2. A voltage indicating apparatus, comprising a vacuum tube circuit including an input portion and an output portion, the input portion being arranged to include the voltage to be indicated, the output portion including an indicating meter and a resistance across which the output current will develop a voltage drop, the input portion being arranged to include said resistance, with said voltage drop opposed to said voltage to be indicated, and means interconnecting said input and output portions for checking the ratio of the applied input voltage and said vacuum tube circuit output current.

3. A voltage indicating apparatus adapted for automatically indicating voltage without drawing appreciable current from the source to be measured, said apparatus including a vacuum tube circuit having a plurality of tubes in cascade and having input and output portions, the input portion being adapted to include the voltage to be measured, the output portion including an indicating meter and a resistance, said input portion including said resistance arranged so that the voltage drop developed in said resistance by the current in said output portion is opposed to the voltage to be measured, and a regeneration control connected to a resistance in said output portion.

4. A voltage indicating apparatus adapted for automatically indicating voltage without drawing appreciable current from the source to be measured, said apparatus including a vacuum tube amplifier having a plurality of tubes and an input circuit portion and an output circuit portion, the input circuit portion being adapted to include a voltage to be measured, the output circuit portion including an indicating meter and a resistance, said input circuit component likewise arranged to include said resistance so that the voltage drop developed in said resistance by the output current is opposed to said voltage to be measured, a regeneration control connected to the resistance in said output portion, a portion at least of the resistance common between said input and output circuit portions being arranged in a bridge circuit, and check potential means adapted to be applied to said bridge circuit for comparing the ratio of applied voltage to the output current of said apparatus.

5. A voltage indicating apparatus adapted for automatically indicating voltage without drawing appreciable current from the source to be measured, said apparatus including a vacuum tube amplifier having a plurality of tubes and an input circuit portion and an output circuit portion, the input circuit portion being adapted to include a voltage to be measured, the output circuit portion including an indicating meter and a resistance, said input circuit portion likewise arranged to include said resistance, a regeneration control connected to the resistance in said output portion, a portion at least of the resistance common between said input and output circuit portions being arranged in a bridge circuit, and check potential means adapted to be applied to said bridge circuit, said check potential being arranged to subtract the voltage in the input circuit portion equal to approximately one-half the voltage range to be measured.

6. An automatic indicating pH apparatus comprising a pH cell, a vacuum tube circuit including input and output portions, the input portion including said pH cell, the output portion including a pH indicating meter and a resistance which is likewise included in said input portion, the polarity of connections of the output and input portions with said resistance being such that the voltage drop induced in said resistance by the output current is opposed to the voltage of said pH cell in said input portion, a portion of said common resistance being arranged in a bridge circuit, and potential means adapted to be applied to said bridge circuit to subtract a voltage equal to one-half the pH range to be covered from the potential applied to the input portion.

7. An automatic indicating pH apparatus comprising a pH cell, a vacuum tube circuit including input and output portions, the input portion including said pH cell, the output portion including a pH indicating meter and a resistance which is likewise included in said input portion, the polarity of connections of the output and input portions with said resistance being such that the voltage drop induced in said resistance by the output current is opposed to the voltage of said pH cell in said input portion, a portion of said common resistance being arranged in a bridge circuit, potential means adapted to be applied to said bridge circuit to subtract a voltage equal to one-half the pH range to be covered from the potential applied to the input portion, and a regeneration control connected to resistance in said output portion.

8. An automatic indicating pH apparatus, comprising a pH cell to be immersed in the solution to be tested, a vacuum tube circuit including input and output portions, the input portion including said pH cell, the output portion including an indicating meter and a resistance which is likewise included in said input portion, the voltage drop induced in said resistance by the current in said output portion being opposed to the voltage of said pH cell, said resistance being arranged to be in the thermal contact with the solution undergoing tests by said pH cell so that it will assume the solution temperature.

9. An automatic indicating pH apparatus including a pH cell, a vacuum tube circuit including input and output portions, the input portion including said pH cell, the output portion including an indicating meter and a resistance which is likewise included in said input portion, the voltage drop induced in said resistance by the current of said output portion being opposed to the voltage of said pH cell, the reciprocal of the mutual conductance of said vacuum tube circuit being negligible in value compared to said resistance, said vacuum tube circuit including regenerative means for increasing its mutual conductance.

10. A voltage indicating apparatus, comprising a vacuum tube circuit including a plurality of vacuum tube amplifiers arranged in cascade and having an input portion and an output portion, the input portion being arranged to include the voltage to be indicated, the output portion including an indicating meter and a resistance which is likewise included in said input portion, the polarity of the connections to said resistance being such that the voltage drop induced in said resistance by the output current is opposed to the voltage to be indicated in said input portion, the reciprocal of the mutual conductance of said vacuum tube circuit being negligible in value compared with said resistance, said vacuum tube circuit including regenerative means to increase its mutual conductance.

11. A voltage indicating apparatus, comprising a vacuum tube circuit having an input and an output portion, the input portion being adapted to include voltage to be measured, the output portion including an indicating meter and a resistance, said input portion likewise including said resistance with the voltage drop induced in said resistance by the current flowing in said output portion opposed to the voltage to be indicated, and checking means including a bridge circuit interconnecting said input and output portions.

12. A voltage indicating apparatus, comprising a vacuum tube circuit having an input and an output portion, the input portion being adapted to include voltage to be measured, the output portion including an indicating meter and a resistance, said input portion likewise including said resistance with the voltage drop induced in said resistance by the current flowing in said output portion opposed to the voltage to be indicated, and checking means including a bridge circuit interconnecting said input and output portions, said vacuum tube circuit including regenerative means for increasing its mutual conductance.

13. An apparatus for indicating voltage originating in a source of very high resistance, including a vacuum tube amplifying circuit having an input portion and an output portion, the resistance of said input portion restricting current drawn from said voltage to be indicated to less than $10^{-11}$ amperes, the output portion including an indicating meter and a resistance through which the output current will develop a voltage drop, said resistance being included within said input portion with the voltage drop opposed to the voltage to be indicated, and a guard shield connected to one terminal of said resistance.

14. A voltage indicating apparatus for indicating voltage originating in a source of very high resistance, comprising a vacuum tube amplifying circuit having a pair of input terminals and an output portion, one of said input terminals being arranged to draw a negligible operating current from the voltage to be indicated and connected to said voltage to be indicated, means for insulating said input terminal, the other input terminal being connected to a resistance the opposite terminal of which is connected to said voltage to be indicated, said output portion of the vacuum tube amplifying circuit including said resistance so that the output current develops a voltage drop in said resistance opposed to the voltage to be indicated, and a guard shield for said insulating means, said guard shield being connected to said second-mentioned input terminal.

15. An automatic apparatus for indicating ionic concentrations, comprising an electrolytic cell generating an E. M. F. depending on the concentrations of selected ions in the electrolyte, a vacuum tube circuit including input and output portions, the input portion including said cell, the output portion including an indicating meter and a resistance which is likewise included in said input portion, the voltage drop induced in said resistance by the current in said output portion being opposed to the voltage of said cell, said resistance being positioned in thermal contact with the electrolyte of said cell and varying in magnitude with the temperature to compensate for the effect of varying temperatures on the E. M. F. generated by said cell.

16. A voltage indicating apparatus comprising a two stage D. C. vacuum tube amplifier having an output portion deriving current from the cathode of the second amplifying stage and an input portion connected to the grid of the first amplifying stage, the output portion including a resistor across which said current will develop a voltage drop and an indicating meter, the input portion including the voltage to be indicated and said resistor with said voltage drop opposed to said voltage to be indicated.

17. A voltage indicating apparatus comprising a two stage D. C. vacuum tube amplifier having an output portion deriving current from the cathode of the second amplifying stage and an input portion connected to the grid of the first amplifying stage, the output portion including a resistor across which said current will develop a voltage drop and an indicating meter, the input portion including the voltage to be indicated and said resistor with said voltage drop opposed to said voltage to be indicated, variations in the reciprocal of the overall mutual conductance of said two stage amplifier being negligible in value compared to said resistance.

HENRY HOWARD CARY.